(12) United States Patent  
Stewart et al.

(10) Patent No.: US 11,072,978 B2
(45) Date of Patent: Jul. 27, 2021

(54) BEND RESTRICTOR

(71) Applicant: Balmoral Comtec Limited, Aberdeen (GB)

(72) Inventors: Blair Stewart, Aberdeenshire (GB); Aneel Gill, Monifieth Dundee Fife (GB)

(73) Assignee: Balmoral Comtec Limited, Aberdeen (GB)

( * ) Notice: Subject to any disclaimer, the term of this patent is extended or adjusted under 35 U.S.C. 154(b) by 0 days.

(21) Appl. No.: 16/644,025

(22) PCT Filed: Sep. 4, 2018

(86) PCT No.: PCT/GB2018/052495
§ 371 (c)(1),
(2) Date: Mar. 3, 2020

(87) PCT Pub. No.: WO2019/043412
PCT Pub. Date: Mar. 7, 2019

(65) Prior Publication Data
US 2021/0032938 A1 Feb. 4, 2021

(30) Foreign Application Priority Data

Sep. 4, 2017 (GB) .................................... 1714172

(51) Int. Cl.
*F16L 57/02* (2006.01)
*E21B 17/01* (2006.01)
*F16L 1/12* (2006.01)

(52) U.S. Cl.
CPC ............ *E21B 17/017* (2013.01); *F16L 1/123* (2013.01); *E21B 17/015* (2013.01)

(58) Field of Classification Search
CPC ......... F16L 57/02; F16L 1/123; E21B 17/017; E21B 17/015
See application file for complete search history.

(56) References Cited

U.S. PATENT DOCUMENTS 6,039,081 A * 3/2000 Albert .................... F16L 1/123
138/110
7,100,641 B2 * 9/2006 Tyrer .................... H02G 9/065
138/110
(Continued)

FOREIGN PATENT DOCUMENTS

EP 2700864 2/2014
WO 2016/080827 5/2016

OTHER PUBLICATIONS

PCT/GB2018/052495 International Preliminary Report on Patentablility and Written Opinion of the International Searching Authority dated Mar. 10, 2020 (6 pages).
(Continued)

*Primary Examiner* — Benjamin F Fiorello
(74) *Attorney, Agent, or Firm* — SmithAmundsen LLC

(57) ABSTRACT

An apparatus (1) for restricting the bending of a tubular member underwater comprises a plurality of interlocking modules each formed from a first half shell component (2) circumferentially displaced from a second half-shell component (3), wherein the first half shell component comprises one or more projections (19) extending from a side edge (18) thereof and the second half shell component comprises one or more grooves (21) in a side edge (18) thereof, the projections and grooves being angled to the side edges of the first and second half shell components, the arrangement being such that when assembled together each of the one of more projections of the first half shell component are inter-engaged with a corresponding groove of the second half shell component to secure the two half shells together.

20 Claims, 3 Drawing Sheets

(56) References Cited

U.S. PATENT DOCUMENTS

| | | | | |
|---|---|---|---|---|
| 8,961,017 B2 * | 2/2015 | Muilenburg | ............... | B23P 6/00 |
| | | | | 384/281 |
| 9,249,633 B1 | 2/2016 | Arizmendi | | |
| 9,404,319 B2 * | 8/2016 | Springett | ................ | H02G 9/12 |
| 9,593,793 B2 | 3/2017 | Benson et al. | | |
| 2007/0029081 A1 * | 2/2007 | Shaw | ....................... | F16L 1/123 |
| | | | | 166/241.3 |
| 2008/0210418 A1 * | 9/2008 | Knippa | ............... | E21B 33/1208 |
| | | | | 166/118 |
| 2008/0317555 A1 * | 12/2008 | De Aquino | ............... | F16L 1/24 |
| | | | | 405/195.1 |
| 2011/0023975 A1 * | 2/2011 | Clark | .................... | F16L 55/168 |
| | | | | 137/15.08 |
| 2012/0241037 A1 * | 9/2012 | Lund | ..................... | E21B 17/017 |
| | | | | 138/106 |
| 2012/0304447 A1 * | 12/2012 | Smith | .................... | E21B 17/017 |
| | | | | 29/434 |
| 2013/0255818 A1 * | 10/2013 | Krohn | ...................... | F16L 1/123 |
| | | | | 138/110 |
| 2014/0377010 A1 * | 12/2014 | Van Belkom | ........... | F16L 1/123 |
| | | | | 405/168.1 |
| 2017/0107770 A1 * | 4/2017 | Harbison | ................. | F16L 27/02 |
| 2017/0328509 A1 * | 11/2017 | Meijer | .................... | F16L 57/02 |
| 2018/0209575 A1 * | 7/2018 | Whitefield | .............. | F16L 57/02 |
| 2019/0145569 A1 * | 5/2019 | Harrop | .................... | F16L 57/02 |
| | | | | 138/110 |

OTHER PUBLICATIONS

PCT/GB2018/052495 International Search Report and Written Opinion of the International Searching Authority dated Dec. 12, 2018 (12 pages).

* cited by examiner

BEND RESTRICTOR

CROSS REFERENCE TO RELATED APPLICATIONS

This application is a nationalization of and claims priority to PCT/GB2018/052495, filed on Sep. 14, 2018, which claims priority to GB1714172.2, filed Sep. 4, 2017, the disclosures of each of which are hereby incorporated by reference in their entirety.

This invention relates to bend restrictors and more specifically to modular components of a bend restrictor and more particularly still, to modular components of a bend restrictor which can be connected together without the use of additional fixings such as bolts, pins or rods.

In the offshore oil and gas industry a variety of tubular members, risers, cables pipes, umbilicals and the like are used for different operations such as for example for carrying hydrocarbons from subsea reservoirs to surface facilities, providing a dedicated pathway for downhole tools, fluids, water circulation, mud or providing power and control lines to subsea equipment to enable them to be operated remotely such as from a surface facility. These tubular members can be either rigid or flexible in nature.

An advantage of a flexible member is that the structure of the member allows it to bend to take up different orientations through the water. This can help in mitigating for movement of the member within the sea for example due to currents to prevent damage to a floating surface platform, allows the member to be more easily retrieved and re-used in another location where a different orientation of the flexible member through the water between the subsea equipment and a surface facility and allows the flexible member to be more easily stored before use or during transportation between operations.

All such flexible members including cables, flexible pipes and umbilicals have a maximum bending radius above which if the tubular member continues to be bent, it can be damaged and become unusable for operation. One of the main areas in which over bending can occur is at the point of attachment between the flexible member and another rigid component. In the offshore oil and gas industry this is most usually a pipeline end termination either at the top end of the flexible member enabling connection to a surface platform or, at the lower end of the flexible member enabling connection of the flexible member to a subsea facility such as a subsea wellhead or manifold for example. Similar issues may arise at rigid pipe cross overs, J-Tube exits and well head connections.

Bend restrictors are typically used to provide protection for the flexible member at these points of connection with other rigid equipment to prevent the flexible member from undergoing a greater bending radius that then member is designed for. A bend restrictor is a device that is mounted around the end of the flexible member and enables attachment of the flexible member to adjacent rigid structures or components and allows the flexible member a degree of freedom of movement and to take up the required position or orientation whilst preventing the tubular member from over bending.

Bend restrictors generally comprise a string of hollow tubular modules each of which can move laterally by a controlled amount with respect to adjacent modules. Whilst the lateral movement of each individual module relative to its adjacent module may be fairly small, the overall lateral movement along the string of modules can be significant.

Each module may comprise a first flared end with a profiled internal socket and a second elongate end which is of a lesser diameter than the flared end and which has a flanged profile. The elongate end of one tubular module can be received within the profiled socket of an adjacent tubular module.

An internal bore extends through the module from the flared end to the elongate end. The diameter of the bore typically increases as it extends through the elongate end. As a cable, umbilical or other flexible member passes through the string of tubular modules of the bend restrictor, the flexible member is able to bend and the modules in the string of modules of the bend restrictor can move relative to the adjacent module to accommodate the bending of the flexible member and allow the flexible member to take up the required orientation. The geometry of the modules of the bend restrictor are such that they limit the relative lateral movement of one module relative to the adjacent module and this in combination with the number of modules in the string controls the overall curvature that the flexible member can make. Therefore the flexible member remains protected by the bend restrictor which prevents any over bending from occurring.

The individual modules of the bend restrictor are often formed of two half shell components which are brought together to surround the tubular member being protected. In some cases each of the half shell components may be formed with flanged edges which are bolted together to form a module of the bend restrictor. Known connection systems for modular bend restrictors include GB2540780, EP2802800 and AU2012375200. Whilst these various systems provide some benefits over standard bolted systems, they either require additional securing means to be provided in order to connect two half shells of a bend restrictor module together and therefore the installation of the bend restrictor requires the operator to manipulate the half shells into the required position and secure each pair of half shells together, or have very complicated geometries which limits the load capabilities and restricts the angular deformation of the string of modules. The present invention aims to provide a modular bend restrictor which can be installed more quickly and requires less individual components to be brought together.

It is an aim of the present invention to provide a modular bend restrictor which can be installed without the use of fixing means such as bolts or screws between the half shell components of each module, or between adjacent modules.

Additionally, the present invention aims to provide a module of a bend restrictor formed of two half shell components wherein the half shell components have inter-engaging connections which are inter-engaged through relative axial movement of the components but prevent radial disconnection of the components.

STATEMENTS OF INVENTION

According to one aspect of the present invention there is provided apparatus for restricting the bending of a tubular member underwater, said apparatus comprising a plurality of interlocking modules each formed from a first half shell component circumferentially displaced from a second half-shell component, wherein the first half shell component comprises one or more projections extending from a side edge thereof and the second half shell component comprises one or more grooves in a side edge thereof, the projections and grooves being angled to the side edges of the first and second half shell components, the arrangement being such that when assembled together each of the one of more projections of the first half shell component are inter-engaged with a corresponding groove of the second half shell component to secure the two half shells together.

As the projections and grooves are angled with respect to the side walls of the first and second half shell components, inter-engagement of the projection(s) of the first half shell component with the groove(s) of the second half shell component requires relative axial movement of the first and second half shell components. Once the projection(s) and groove(s) are inter-engaged, the first and second half shell components cannot be radially separated.

Advantageously the projections of the first half shell component and the grooves of the second half shell component are provided in both side edges of the respective components.

Preferably the projections and grooves are provided at an angle of between 40 and 50 degrees to the side edges of the components.

More preferably, the projections and grooves are provided at an angle of about 45 degrees to the side edges of the components.

Advantageously the first half shell component comprises two angled projections and the second half shell component comprises two cooperating angled grooves.

Conveniently the slots of the second half shell component have a depth of around 50% of the thickness of the second half shell component.

Conveniently also the projections have a thickness of around 50% of the thickness of the first half shell component.

Advantageously each projection comprises a base portion in the region where the projection meets the side edge of the first half shell component.

Conveniently the base portion of each projection has a greater width than the remainder of the projection.

Advantageously the length of the or each groove is greater than the length of the or each projection.

Conveniently each of the first and second half shell components comprise a female portion and a male portion.

Advantageously a socket is formed in the female portion of each half shell component.

Preferably a channel is formed through each half shell component from the female to the male portion. The channel is open at either end and forms a conduit through which a tubular member can pass.

Preferably the male portion of the conduit comprises an elongate neck. Preferably also the diameter of the neck is less than the diameter of the female portion of the components. Preferably also the neck terminates in a nose portion. The nose portion has a diameter greater than the neck but less than that of the female portion. Advantageously a first abutment surface is provided between the neck and the nose portion.

Conveniently a second abutment surface is provided within the socket of the female portion.

Preferably a third abutment surface is provided between the female portion and the neck portion.

Conveniently a fourth abutment surface is provided on an outer end surface of the female portion.

The arrangement of abutment surfaces is such that when a plurality of modular components are interconnected, the first and third abutment surfaces of a first module abut with the second and fourth abutment surfaces respectively of a second module.

According to a second aspect of the present invention there is provided a module of a bend restrictor apparatus comprising a first half shell component circumferentially displaced from a second half-shell component, wherein the first half shell component comprises one or more projections and the second half shell component comprises one or more slots, the arrangement being such that each of the one of more projections of the first half shell component is inter-engaged with a corresponding slot of the second half shell component and wherein the projections and slots are angled such that the first and second half shell components cannot be radially separated.

Exemplary embodiments of the present invention will now be described with reference to the accompanying figures in which.

Turning now to the drawings, a modular bend restrictor 1 is formed by a plurality of interlocking modules each formed from a first half shell component 2 circumferentially displaced from a second half-shell component 3 around a tubular member (not shown).

Figure 1:
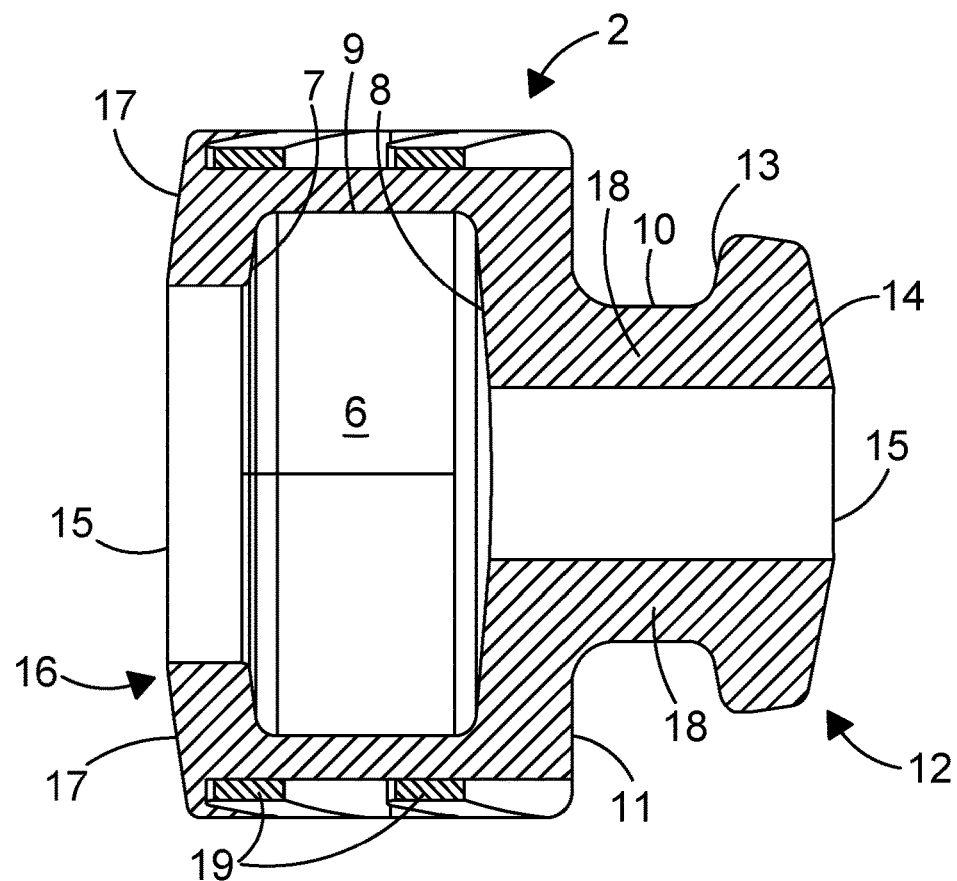
FIG. 1 is an internal side view of a first half shell component of a module of a bend restrictor according to one embodiment of the present invention.
Figure 2:
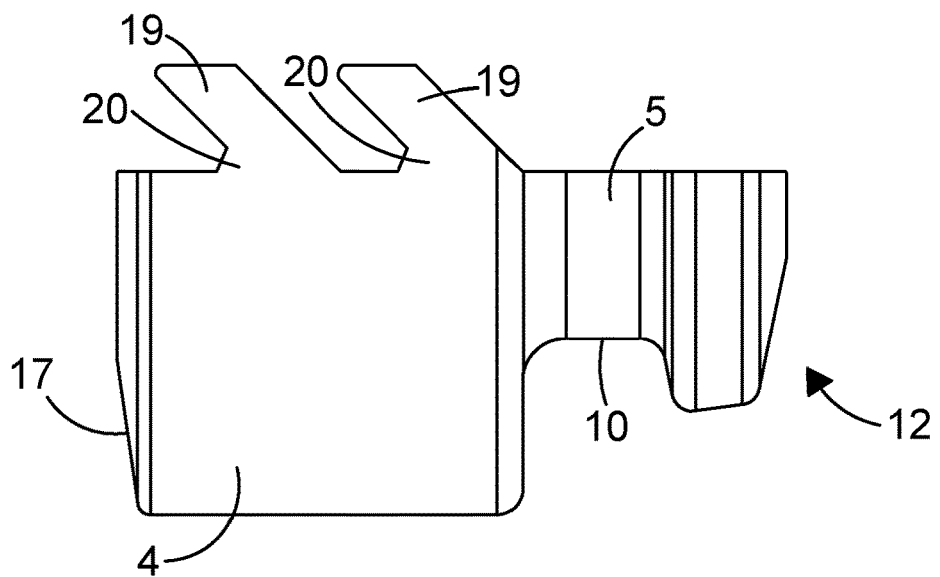
FIG. 2 is an external side view of the first half shell component of FIG. 1.

The first half shell 2 is shown in FIGS. 1 and 2 and comprises a hollow tubular body with a female portion 4 at one end and a male portion 5 at the other. The female portion of the tubular body comprises a deep internal socket 6 which is substantially rectangular in plan view as shown in FIG. 1. The socket has an internal annular base wall 7, an internal top wall 8 and internal side walls 9 that connect the base and top walls together. The internal annular base wall is tapered away from the internal side walls and also away from the internal top wall.

The male portion of the tubular body is integrally formed with the female portion and extends concentrically from the female portion adjacent to the top internal wall 9 of the socket. The male portion comprises a neck 10 which has a diameter which is less than that of the female portion 4. A substantially horizontal abutment shoulder region 11 is formed on the outer surface of the body between the female portion and the neck 10 as will be described further below.

The neck terminates in a nose portion 12 which has a diameter slightly larger than that of the neck 11 but less than that of the female portion 4 of the component. An annular flange 13 is provided between the neck and the nose portion. The annular flange tapers towards the nose portion.

The diameter of the nose portion 12 is also less than the diameter of the internal socket 6 within the female portion 4 of the body. The height of the nose portion 12 is less than the distance between the annular base wall 7 and internal top wall 8 of the socket 6 of the female portion.

The outer end 14 of the nose portion, remote from the neck 10 of the component, has a frustoconical shape as clearly shown in FIGS. 1 and 2.

A semi-circular channel 15 is formed through the first component from the female portion 4 to the male portion 5 as will be described further below. The channel has a first diameter between the base 16 of the female portion and the annular base wall 7 of the socket and a reduced diameter through the male portion 5 between the internal top wall 9 of the socket and the outer end 14 of the nose portion. The diameter of the channel through the female portion 4 is smaller than the diameter of the socket 6 within the female portion.

The base 16 of the female portion of the first half shell, surrounding the open end of the semi-circular channel 15, is substantially flat to form an annular abutment flange 17. The flange is tapered from the internal diameter adjacent the semi-circular channel 15 to the outer diameter. The flange tapers towards the male portion 5 of the first half shell component.

The side edges 18 of the first half shell component, surrounding the semi-circular channel 15 and socket 6 are flat as shown in FIG. 1.

One or more projections 19 extend from the outer surface of each of the side edges 18 of the female portion of the body. Two projections are shown in FIG. 1 although a single projection or additional projections may be provided in other embodiments. The projections 19 are integrally formed with the hollow body. As shown most clearly in FIG. 2, the projections are substantially rectangular in form with a length L and a width W. The length of the projections is greater than the width. The projections are provided at an angle to the side edges of the tubular body.

The projections may be set to about a 30 to 60 degree angle to the side edges of the body. Preferably the projections are set to about a 40 to 50 degree angle to the side edges of the body. In some embodiments, the set angle may be about 45 degrees. In the embodiment shown, the first projection extends from the end of the female portion 4 adjacent the neck 10 of the body and extends outwards and downwards away from the neck portion. The second projection extends from a point about midway along the side edges 18 of the body. The projections can therefore be considered to be barbs angled away from the nose portion 12 of the component. The thickness of the projections is generally about 50% of the thickness of the female portion 4 of the body.

Each projection 19 has a base portion 20 formed at the lower end of the projection where it meets the side edge 18 of the tubular body. The base portion of the projections has a greater width than the extreme outer end of the projections. The base is flared such that the base portion of the projections is substantially frusto-conical in the region where it meets the side edge of the tubular body.

Figure 3:
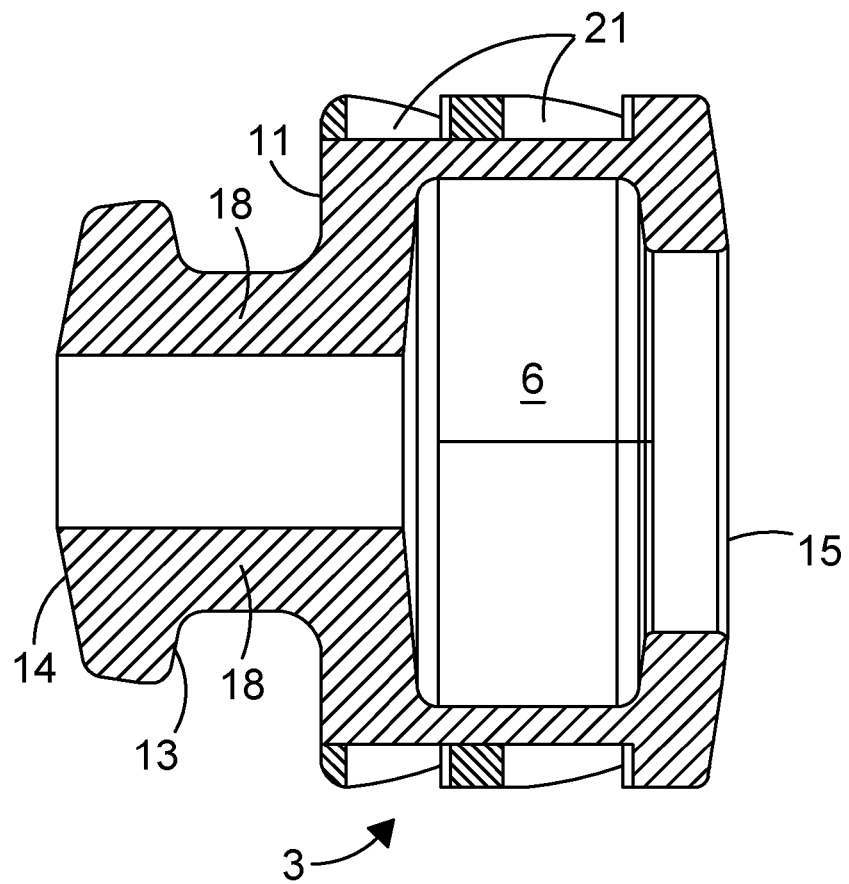
FIG. 3 is an internal side view of a second half shell component of a module of a bend restrictor according to the said embodiment of the present invention.
Figure 4:
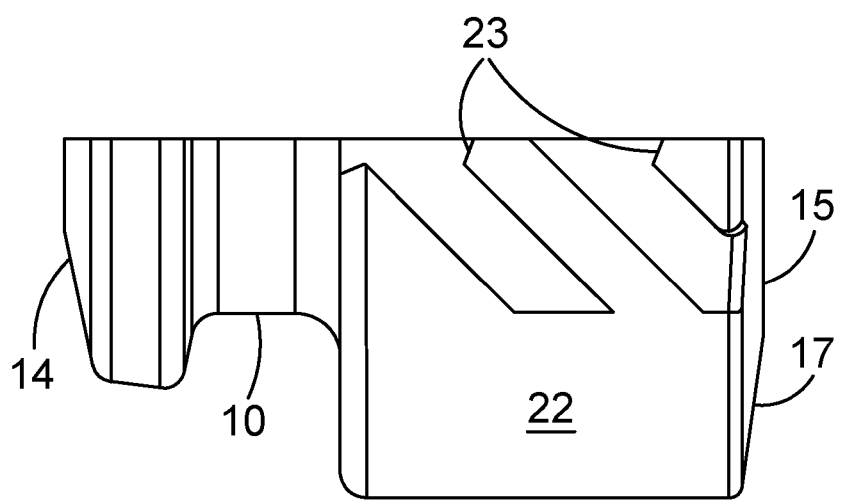
FIG. 4 is an external side view of the second half shell component of FIG. 3.

The first half shell component 2 is intended to interconnect with or mate with a second half shell component 3 to form a module of the bend restrictor 1. The second half shell component is shown in FIGS. 3 and 4.

The internal features of the second half shell component are identical to those of the first half shell component. Similarly the neck 10 and nose portions 12 are identical such that when the first and second half shell components are brought together with the side edges 18 of the first component overlying the side edges of the second component, this forms a hollow substantially annular body with an annular socket 6 at one end and an annular neck 10 extending from the body away from the socket and terminating in an annular nose portion 12.

The first and second half shell components differ in that in place of the projections of the first half shell component, angled grooves or channels 21 are provided in the outer surface 22 of the female portion of the second half shell component. The number of grooves will match the number of projections on the first half shell component so in the illustrated embodiment, two angled grooves are shown. As with the projections of the first half shell component, the grooves of the second half shell component are angled away from the neck portion 10 of the component with the opening or entry point into the grooves closer to the nose portion 12 of the component than the internal closed end of the grooves. The angle of the grooves to the side wall of the second half shell component is substantially the same as that of the projections to the side wall of the first half shell component.

The open end or entry 23 into a groove is wider than the rest of the groove to provide a substantially frusto-conical region followed by a substantially rectangular region. The groove is shaped to securely receive the flared base portion 20 of a projection and the extended body of the projection as will be described further below. The depth of the grooves is substantially the same as the thickness of the projections 19 as will be described further below. The length of the grooves from the side edges 18 of the second shell component around the outer surface 22 of the second shell component is slightly longer than the length L of the projections as will also be described further below.

In order to connect the first and second half shells together, the first and second half shells 2, 3 are aligned such that the free end of each of the projections 19 of the first half shell is aligned with the entry into a groove 21 on the outer surface of the second half shell component. In this position, the first and second half shell components 2, 3 will be axially offset and a gap will be formed between the respective side edges 18 of the two components.

As the two half shell components are pushed together, the projections 19 will slide within and along the grooves 21 and draw the half shell components both into axial alignment and also together such that the gap between the side walls 18 of the two components is reduced.

When the projections 19 are fully engaged within the grooves, the side walls 18 of the first and second half shell components will abut each other. No external or internal locking pins or bolts are required in order to securely fasten the two half shell components together because when the two half shells are fully connected and the projections of the first half shell are inter-engaged with the grooves of the second half shell component, the two half shells cannot be radially disconnected.

As the depth of the grooves 21 is substantially equal to the thickness of the projections 19, the outer surface of the projections of the first half shell component lies in the same plane as the outer surface of the body of the second half shell component.

The two half shells can only be separated by moving the components 2, 3 apart axially such that the projections 19 slide out of the grooves 21 thus increasing the axial offset between the two components and increasing the gap between the side edges 18 of the components.

This provides a very quick and effective connection mechanism for the half shell components to form modules of a bend restrictor 1 and reduces the installation time considerably compared to known bend restrictors. The present invention also provides a reduction in the number of components required to be transported to an installation site which can lead to further efficiency savings in terms of transportation and time.

When a bend restrictor 1 is required to be formed from the modules as described above, a reaction piece (not shown) is mounted around the tubular member and the first module of the bend restrictor is created by bringing a first and second half shell component 2, 3 together around the tubular member to which bend protection is required to be provided as described above, with the projections 19 of the first component inter-engaged with the grooves 21 of the second component. The first module is attached to the reaction piece in a known manner.

A further set of first and second half shell components 2, 3 is then taken and brought together around the tubular member with the nose portion 12 of the first module of the bend restrictor seated within the socket 6 of the second module. As the nose portion 12 of the first module has a greater diameter than the semi-circular channel 15 through the female portion 4 of the second module, the nose portion 12 of the first module is securely retained within the socket 6 of the second module.

Whilst the height of the nose portion 12 of the first module is less than the distance between the internal annular base wall 7 and internal top wall 8 of the socket of the female portion of the second module, which may allow for some relative axial movement between the first and second half shell components 2, 3 of the first module, the space between the outer end 14 of the nose portion of the first module and the internal top wall 8 of the socket of the second module is less than the length of the projections 19 and therefore the two half shell components 2, 3 cannot move sufficiently far apart axially as to allow the projections 19 of the first component to move out of engagement with the grooves 21 of the second component.

Further modules are formed using pairs of half shell components 2, 3 and each is installed around the tubular member trapping the nose portion 12 of the preceding module with the socket 6 of the next module.

A fastener component is mounted around the nose portion 12 of the last module of the bend restrictor, remote from the reaction piece. The fastener component is similar in form to a module of the bend restrictor although the fastener component only has a female portion with an internal socket but no male portion with a neck and nose and no angled projections or grooves. The fastener component prevents the two half shell components of the last module from moving axially relative to one another to sufficient degree to allow the angled projections of the first half shell from falling out of inter-engagement with the grooves of the second half shell. The two half shells of the fastener component are secured together by standard fixings such as bolts or screws.

Whilst the innovative connection mechanism between the first and second half shell components of the modules of the bend restrictor provide significant advantages as noted above in terms of simpler installation and reduced installation times, the geometry of the modules also provides additional advantages when the bend restrictor is operating.

Figure 5:
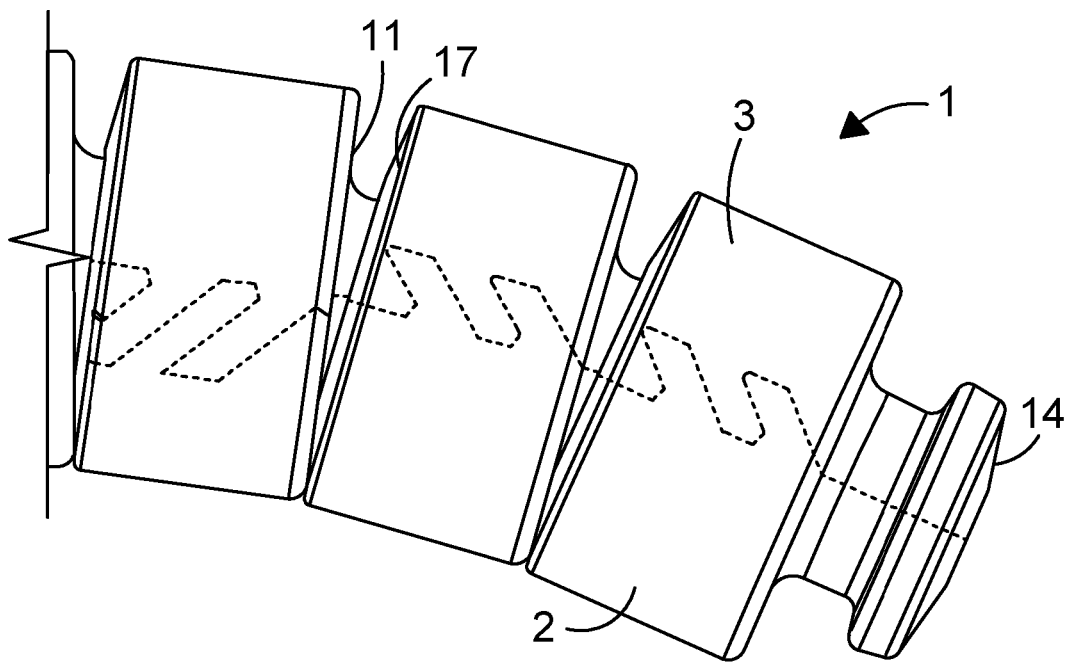
FIG. 5 is an external side view of a bend restrictor formed of a plurality of interlocking components of FIGS. 1 and 3.

When the nose portion 12 6 of the first module sits within the socket of the second module, as the height of the nose portion is less than the distance between the annular base 7 and top wall 8 of the socket, a gap is provided between the outer frusto-conical end 14 of the nose portion and the internal top wall 8 of the socket. FIG. 5 shows three modules connected together axially to provide a bend restrictor 1. As described above, each module of the bend restrictor is held together firmly by the inter-engagement of the angled projections 19 and grooves 21 of the first and second half shell components 2, 3.

Figure 6:
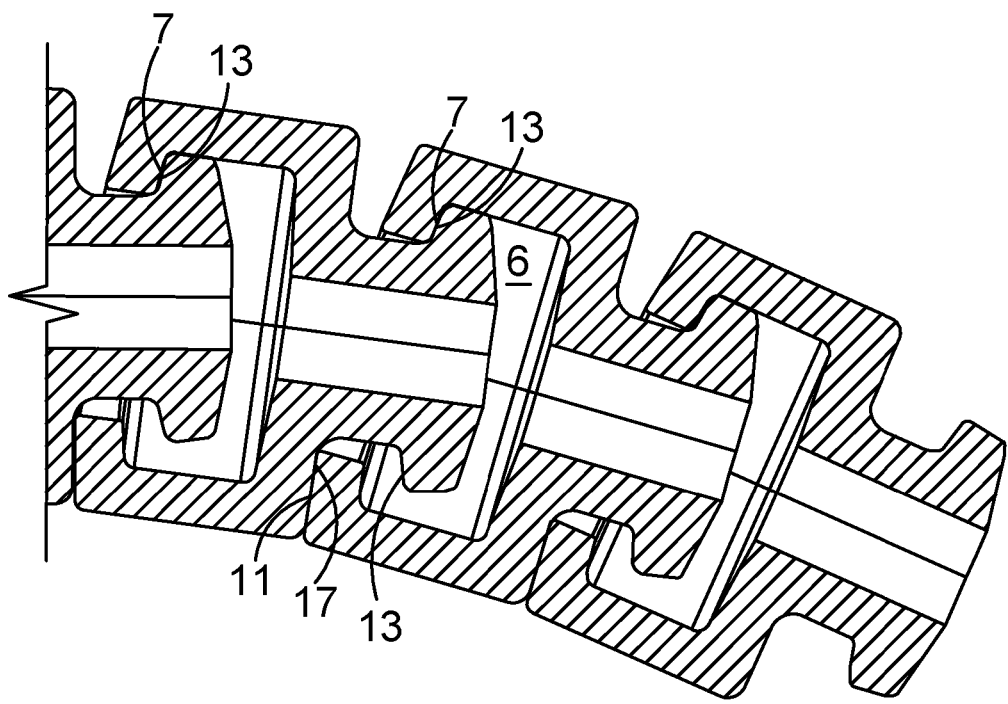
FIG. 6 is a cross sectional view through the bend restrictor of FIG. 5.

FIG. 6 shows a cut away view of the bend restrictor of FIG. 5 and illustrates the interaction between each adjacent pair of modules.

As the tubular member flexes, the bend restrictor 1 can bend to a limited degree to prevent the tubular member from over bending, beyond the limits of the flexible member. As shown in FIG. 6, at the point of maximum angular deflection between the first and second modules of the bend restrictor, there is no contact between the outer frusto-conical end 14 of the nose portion 12 of the first module and the internal top wall 8 of the socket 6 of the second module.

In this condition the annular tapered flange 13 between the neck 10 and nose portion 12 of the first module abuts the upper edge of the tapered internal annular base wall 7 of the socket.

Additionally, the lower edge of the annular abutment shoulder 11 between the female portion 4 and the neck 10 of the first module abuts the lower edge of the annular abutment flange 17 on the outer edge of the female portion of the second module. The geometry of the various abutment surfaces limits the angular deflection between adjacent modules as noted above, but as will be understood by the skilled person, as the modules reach the maximum angular deflection position, the side edges of the angled projections 19 are forced against the side edges of the angled grooves 21 and therefore the high loads transmitted through the modules can be distributed through the abutting surface of the half shell component of the modules acting to draw each pair of first and second half shell components into tighter inter-engagement and so avoiding the need for any additional fixings such as bolts or screws between the pairs of half shell components.

Whilst FIGS. 5 and 6 show the bend restrictor 1 bent downwards, the modules of the bend restrictor can of course allow for relative bending in other directions, for example 180 degrees from the illustrated embodiment such that the bend restrictor bends upwards over its length. Alternatively the bend restrictor allows for later being of the tubular member being protected.

In each case, when one side of the annular tapered flange 13 is forced against the annular base wall 7 of the female portion, the portion of the abutment shoulder 11 diametrically opposite will be in contact with the annular abutment flange 17 of the female portion. The nose portion 12 of the first module is therefore wedged within the semi-circular channel 15 of the second module.

It is envisaged that the modules of the bend restrictor may be formed of various materials. For example the modules may be formed of a plastics material and preferably a mouldable plastics material. Examples of preferred materials include a rigid polymer material such as for example polyurethane or nylon. Preferably the hardness of such material will be greater than 60 shore D and in some embodiments may be around 80 shore D. Such materials are particularly effective as they can by pumped and moulded to provide a stock of half shell components which can be transported to a required installation site and connected together around a tubular member to build a modular bend restrictor of the required length quickly and easily. Additionally, when the bend restrictor is no long required, the components can be disengaged quickly and the bend restrictor dismantled such that the components can be moved to a new site for installation, or alternatively can be simply stored for later reuse.

Alternatively composite materials such as fibre reinforced or glass reinforced plastics material or carbon reinforced plastics material may be used to form the half shell components. The composite material may be any high tensile strength, high tensile modulus material, for example but not limited to, fibre-reinforced epoxy composites or corrosion resistant metal sheet. Epoxy composites may be preferred to maximise inter-material bond strength.

In some situations it may be preferably to form the half shell components from a metal material such as steel for example.

What is claimed is:

1. An apparatus for restricting the bending of a tubular member underwater, said apparatus comprising a plurality of interlocking modules each formed from a first half shell component circumferentially displaced from a second half-shell component, each of the first and second half-shell components comprising a first end and a second end and side edges extending between the first and second ends, wherein the first half shell component comprises one or more projections extending from the side edge thereof and the second half shell component comprises one or more grooves in the side edge thereof, the projections and grooves being angled the side edges of the first and second half shell components towards the first end of the components, the arrangement being such that when assembled together each of the one of more projections of the first half shell component are inter-engaged with a corresponding groove of the second half shell component to secure the two half shells together such that the two half shells cannot be radially separated without axial displacement of one half shell component relative to the other.

2. An apparatus according to claim 1, wherein the projections of the first half shell component and the grooves of the second half shell component are provided in both side edges of the respective components.

3. An apparatus according to claim 1, wherein the projections and grooves are provided at an angle of between 40 and 50 degrees to the side edges of the components.

4. An apparatus according to claim 1, wherein the first half shell component comprises two angled projections and the second half shell component comprises two cooperating angled grooves.

5. An apparatus according to claim 1 wherein the groove or grooves of the second half shell component have a depth of around 50% of the thickness of the second half shell component.

6. An apparatus according to claim 1 wherein the projection or projections have a thickness of around 50% of the thickness of the first half shell component.

7. An apparatus according to claim 1 wherein the or each projection comprises a base portion in the region where the projection meets the side edge of the first half shell component.

8. An apparatus according to claim 1 wherein each of the first and second half shell components comprise a female portion and a male portion.

9. An apparatus according to claim 8, wherein a channel is formed through each half shell component from the female to the male portion.

10. An apparatus according to claim 9, wherein the channel is open at either end and forms a conduit through which a tubular member can pass.

11. An apparatus according to claim 8, wherein the male portion of the conduit comprises an elongate neck.

12. An apparatus according to claim 11, wherein the diameter of the neck is less than the diameter of the female portion of the components.

13. An apparatus according to claim 12, wherein the neck terminates in a nose portion.

14. An apparatus according to claim 13, wherein the nose portion has a diameter greater than the neck but less than that of the female portion.

15. An apparatus according to claim 13, wherein a first abutment surface is provided between the neck and the nose portion.

16. An apparatus according to claim 15, wherein a second abutment surface is provided within the socket of the female portion.

17. An apparatus according to claim 16, wherein a third abutment surface is provided between the female portion and the neck portion.

18. An apparatus according to claim 17, wherein a fourth abutment surface is provided on an outer end surface of the female portion.

19. An apparatus according to claim 18, wherein the arrangement of abutment surfaces is such that when a plurality of modular components are interconnected, the first and third abutment surfaces of a first module abut with the second and fourth abutment surfaces respectively of a second module.

20. A module of a bend restrictor apparatus comprising a first half shell component circumferentially displaced from a second half-shell component, each of the first and second half-shell components comprising a first end and a second end and side edges extending between the first and second ends, wherein the first half shell component comprises one or more projections extending from the side edge thereof and the second half shell component comprises one or more slots, the arrangement being such that each of the one of more projections of the first half shell component is inter-engaged with a corresponding slot of the second half shell component and wherein the projections and slots are angled from the side edges of the first and second half shell components towards the first end of the components, such that the first and second half shell components cannot be radially separated without axial displacement of one half shell component relative to the other.

* * * * *